United States Patent [19]

Stephens

[11] Patent Number: 5,275,431
[45] Date of Patent: Jan. 4, 1994

[54] AIR BAG INFLATOR ASSEMBLY
[75] Inventor: Peter C. Stephens, Chandler, Ariz.
[73] Assignee: TRW Inc., Lyndhurst, Ohio
[21] Appl. No.: 761,676
[22] Filed: Sep. 18, 1991
[51] Int. Cl.⁵ .............................................. B60R 21/16
[52] U.S. Cl. .................................. 280/728 A; 280/741
[58] Field of Search ............... 280/731, 732, 736, 741, 280/743, 728

[56] References Cited

U.S. PATENT DOCUMENTS

| | | | |
|---|---|---|---|
| 4,325,568 | 4/1982 | Clark et al. | 280/731 |
| 4,830,401 | 5/1989 | Honda | 280/736 |
| 4,877,264 | 10/1989 | Cuevas | 280/731 |
| 4,902,036 | 2/1990 | Zander et al. | 280/736 |
| 4,913,461 | 4/1990 | Cuevas | 280/731 |
| 4,988,119 | 1/1991 | Hartmeyer | 280/743 |
| 5,141,247 | 8/1992 | Barth | 280/728 A |

FOREIGN PATENT DOCUMENTS

| | | | |
|---|---|---|---|
| 815530 | 10/1951 | Fed. Rep. of Germany | 280/728 |
| 1079612 | 8/1967 | United Kingdom | 280/730 |

Primary Examiner—Karin L. Tyson
Attorney, Agent, or Firm—Tarolli, Sundheim & Covell

[57] ABSTRACT

An apparatus for restraining a vehicle occupant includes an inflatable vehicle occupant restraint, an inflator for inflating the restraint, and a support plate for supporting the restraint and the inflator in the vehicle. The apparatus also includes a retainer member having a wall with an annular wall surface encircling the inflator. The retainer member also has first means connectable with the support plate and second means clamping the inflator to the retainer member. The second means includes a crimped portion of the annular wall surface.

23 Claims, 4 Drawing Sheets

AIR BAG INFLATOR ASSEMBLY

FIELD OF THE INVENTION

The present invention relates to an apparatus which includes an inflatable vehicle occupant restraint, such as an air bag, and an inflator for inflating the restraint.

BACKGROUND OF THE INVENTION

U.S. Pat. No. 4,988,119 discloses an apparatus which includes an inflatable air bag. The apparatus disclosed in the '119 patent also includes an inflator for inflating the air bag, and a support plate for supporting the inflator and the air bag in the vehicle. The inflator and the air bag are attached to the support plate by a retainer ring and a plurality of rivets. The retainer ring has a plurality of axially extending studs through which the rivets extend. When the apparatus is assembled, the studs on the retainer ring are inserted through apertures in the inflator, the air bag, and the support plate. The rivets are inserted through the studs on the retainer ring to attach the retainer ring, the air bag and the inflator to the support plate.

SUMMARY OF THE INVENTION

In accordance with the invention, an apparatus comprises an inflatable vehicle occupant restraint, an inflator for inflating the restraint, and a support member which supports the restraint and the inflator in the vehicle. The apparatus further comprises a retainer member having a wall with an annular wall surface encircling the inflator. The retainer member also has first means connectable with the support member, and second means clamping the inflator to the retainer member. The second means includes a crimped portion of the annular wall surface.

In a preferred embodiment of the invention, the inflator has a housing with a flange. The wall of the retainer member is an annular wall encircling the inflator housing. The retainer member also has a first retainer flange extending from the annular wall and a second retainer flange extending from the annular wall at a location spaced axially from the first retainer flange. The first retainer flange is connectable with the support member by fasteners. The second retainer flange and the crimped portion of the annular wall surface clamp the inflator flange between the second retainer flange and the crimped portion of the annular wall surface.

BRIEF DESCRIPTION OF THE DRAWINGS

The foregoing and other features of the present invention will become apparent to those skilled in the art to which the present invention relates- upon reading the following description of a preferred embodiment of the invention with reference to the accompanying drawings, wherein.

DESCRIPTION OF A PREFERRED EMBODIMENT

Figure 1:
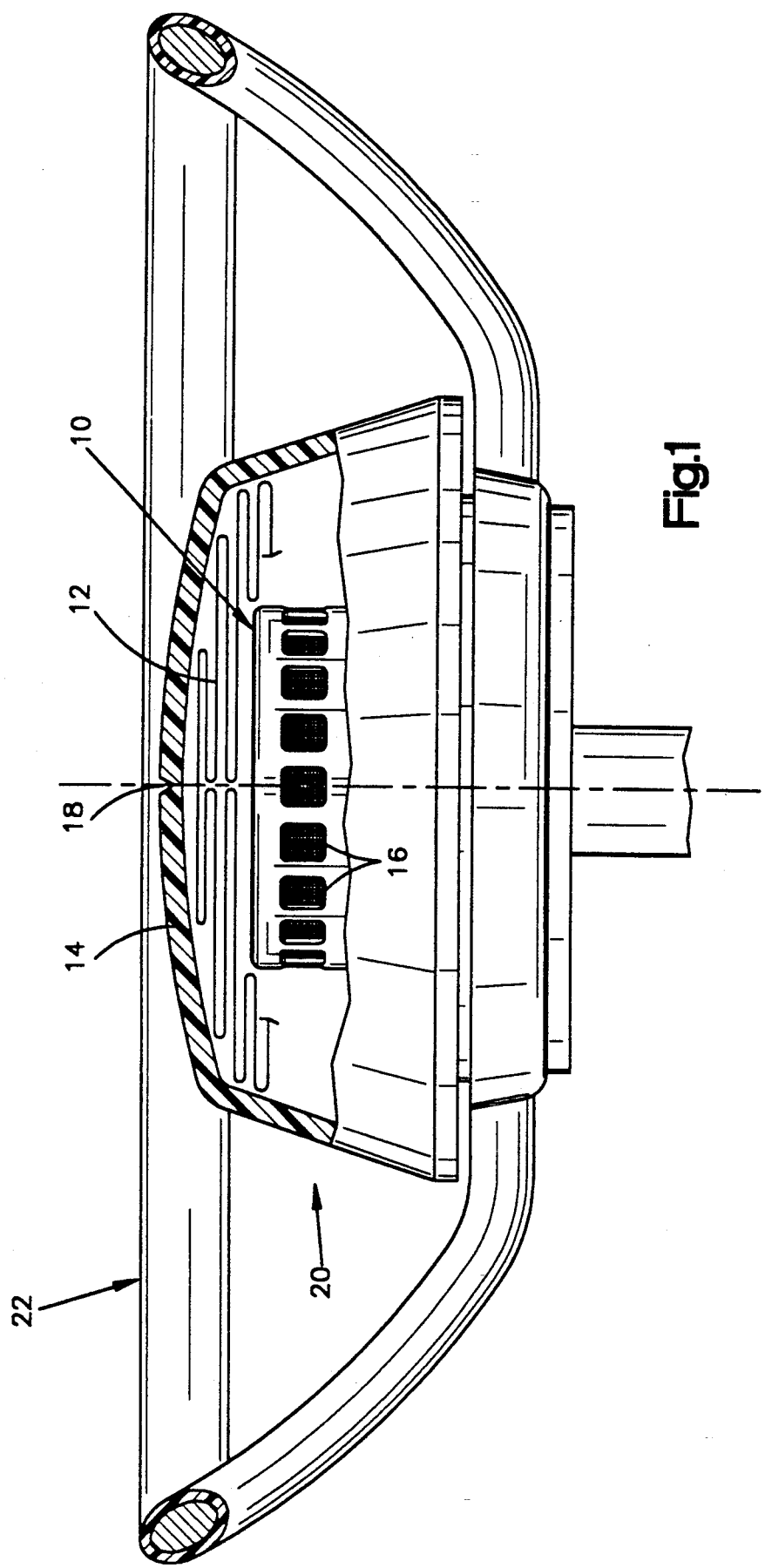
FIG. 1 is a side view of a vehicle steering wheel and an apparatus constructed in accordance with the present invention.

As shown in FIG. 1, a vehicle occupant restraint apparatus constructed in accordance with the present invention comprises an inflator 10 and an inflatable air bag 12. A cover 14 encloses the inflator 10 and the air bag 12. The inflator 10 has gas outlet openings 16, and contains a gas generating material (not shown). The air bag 12 is received over the inflator 10 in a folded condition, as shown schematically in FIG. 1. The cover 14 has a relatively weak portion 18, and covers the inflator 10 and the air bag 12. The inflator 10, the air bag 12 and the cover 14 are parts of a module 20 which is mounted on a vehicle steering wheel 22.

Upon the occurrence of sudden vehicle deceleration, such as occurs in a vehicle collision, the inflator 10 is energized, and the gas generating material contained in the inflator 10 produces a large volume of gas. The gas produced by the gas generating material emerges from the gas outlet openings 16 and expands the air bag 12. As the air bag 12 begins to expand, it breaks the relatively weak portion 18 of the cover 14. As the air bag 12 continues to expand, it moves past the broken cover 14 into the space between the driver of the vehicle and the steering wheel 22 to restrain movement of the driver, as is known.

Figure 2:
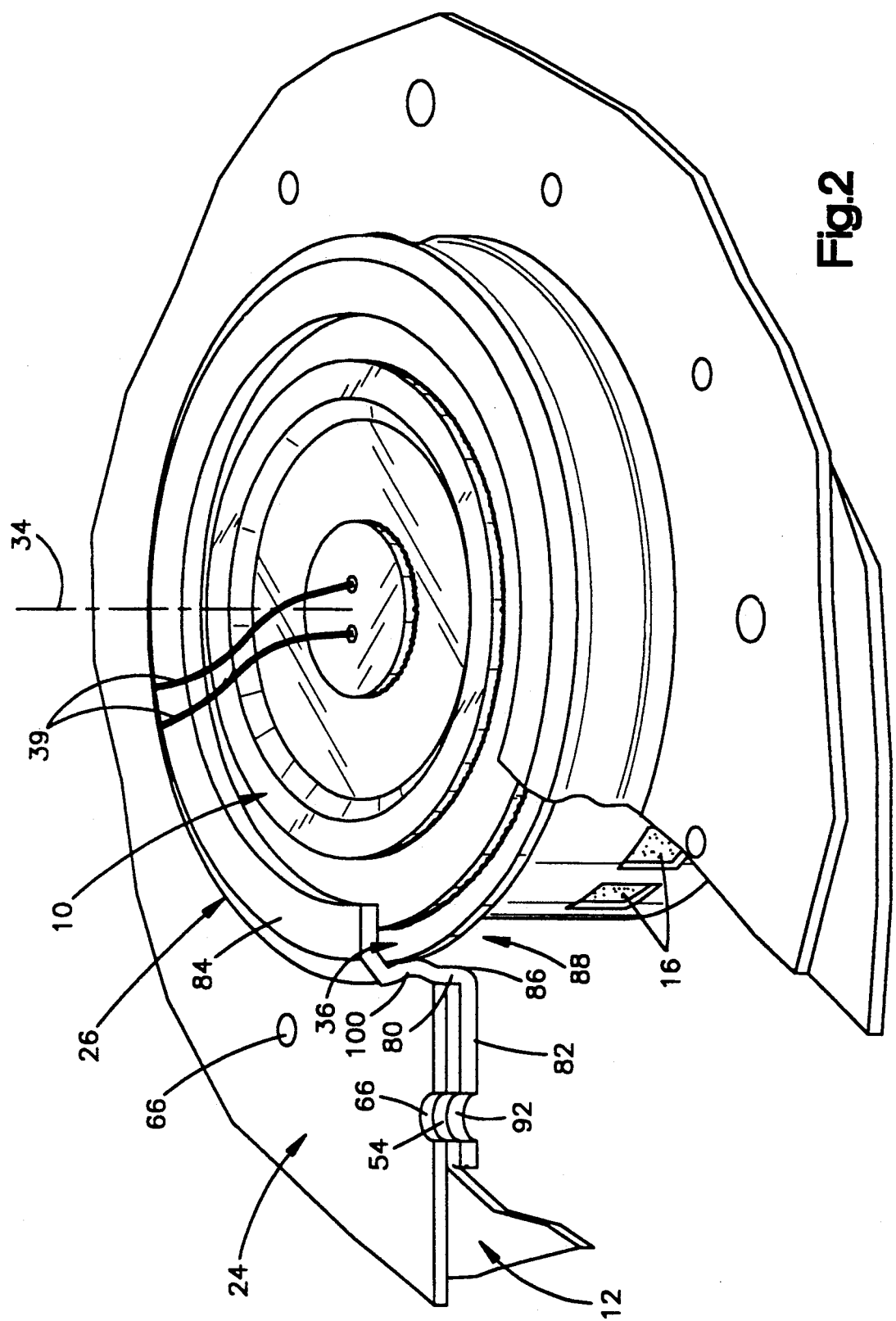
FIG. 2 is a perspective view of parts of the apparatus of FIG. 1 in a partially assembled condition.

FIG. 2 shows the module 20 in a partially assembled condition without the cover 14. For the purpose of illustration, the parts of the module 20 shown in FIG. 2 are overturned relative to the steering wheel 22 shown in FIG. 1. is shown in FIG. 2, the module 20 includes a support plate 24 and a retainer 26 in addition to the inflator 10 and the air bag 12. The support plate 24 supports the other parts of the module 20 on the steering wheel 22. The retainer 26 connects the inflator 10 to the support plate 24.

Figure 3:
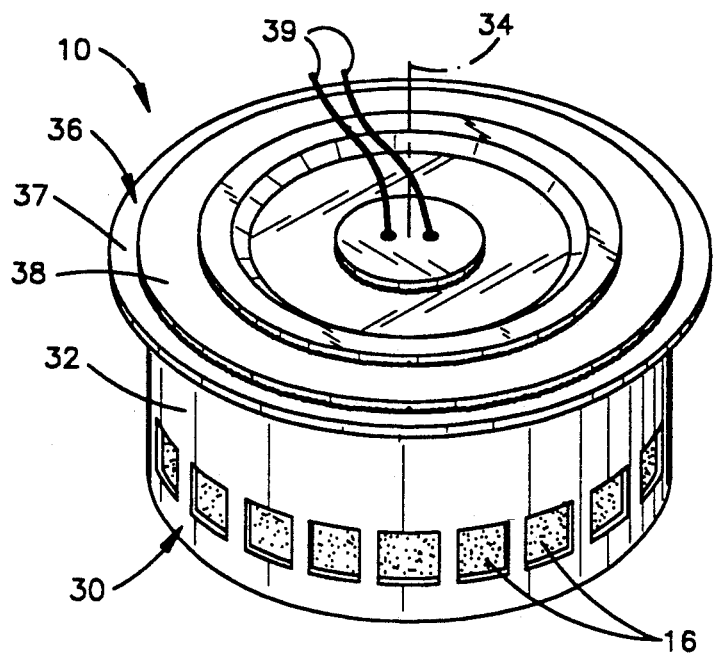
FIG. 3 is a perspective view of a part of the apparatus of FIG. 1.

As shown in FIG. 3, the inflator 10 has a cylindrical housing 30. The housing 30 has a cylindrical body wall 32 with a central axis 34. The housing 30 also has a circular flange 36 extending radially outward in a direction perpendicular to the axis 34. The flange 36 is formed in part by an end portion 37 of the cylindrical body wall 32, and in part by a circular end wall 38 of the housing 30. A pair of lead wires 39 extends from the inflator 10. The lead wires 39 transmit an ignition signal to an igniter (not shown) in the inflator 10 to energize the inflator 10, in a known manner, upon the occurrence of sudden vehicle deceleration.

Figure 4:
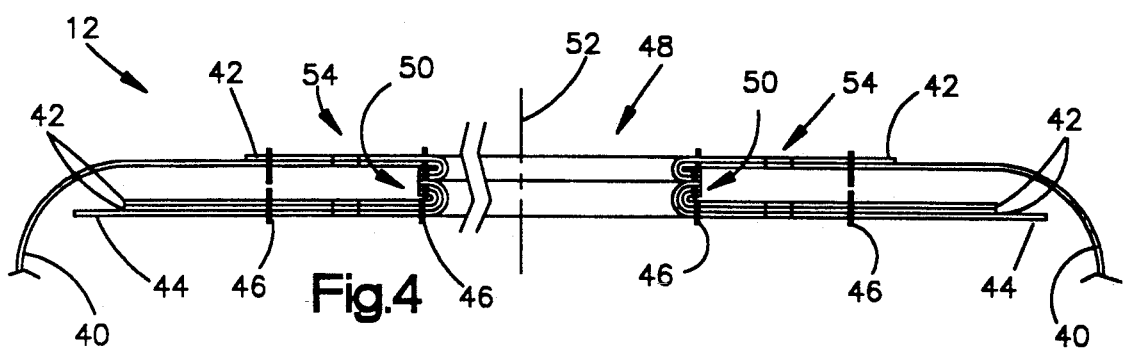
FIG. 4 is a sectional view of a part of the apparatus of FIG. 1.

As shown in FIG. 4, the air bag 12 may be formed of several panels which are sewn together The panels include a main panel 40 defining the body of the air bag 12, reinforcing panels 42, and a heat shield panel 44. The panels 40, 42 and 44 are sewn together into overlying relationship by stitching 46, as shown schematically in FIG. 4. The panels 40, 42 and 44 define a circular opening 48 and a doubled-over portion 50 of the air bag 12 which extends circumferentially around the opening 48. The opening 48 is centered on an axis 52 and has a diameter larger than the diameter of the flange 36 on the inflator 10. A plurality of apertures 54 extend through the air bag 12 adjacent to the opening 48. The panels 40, 42 and 44 are preferably formed of nylon with a neoprene coating.

Figure 5:
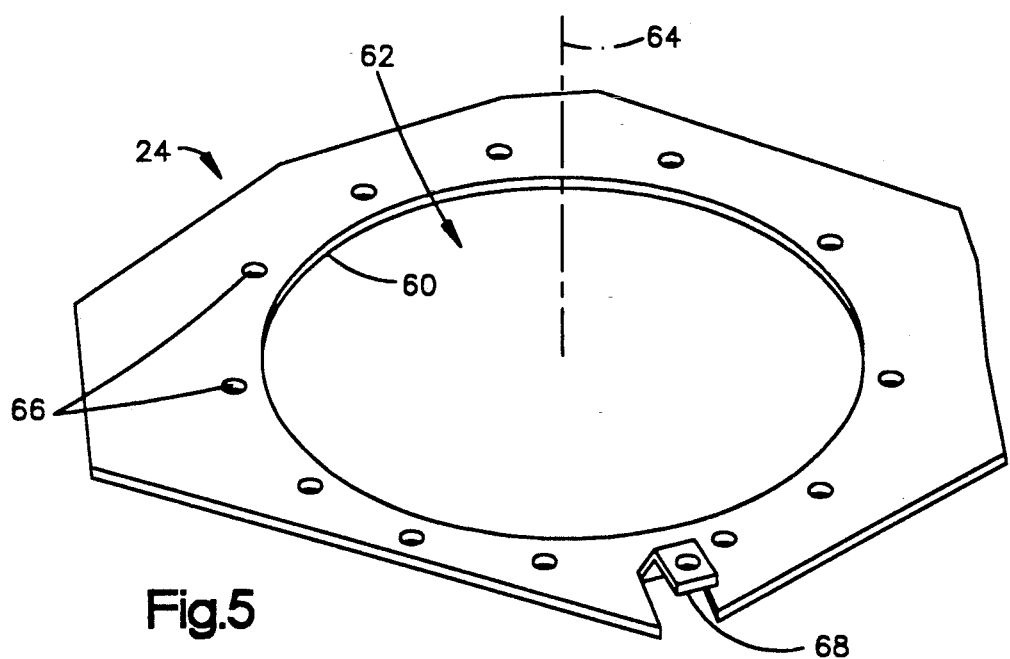
FIG. 5 is a partial perspective view of a part of the apparatus of FIG. 1.

As shown partially in FIG. 5, the support plate 24 has a circular edge surface 60 defining a circular opening 62. The opening 62 is centered on an axis 64 and has a diameter greater than the diameter of the flange 36 on the inflator 10. A plurality of apertures 66 extend through the support plate 24 adjacent to the opening 64. The support plate 24 also has a plurality of tabs 68 (one of which is shown in FIG. 5) for connecting the support plate 24 to the hub of the steering wheel 22 by suitable fasteners.

Figure 6:
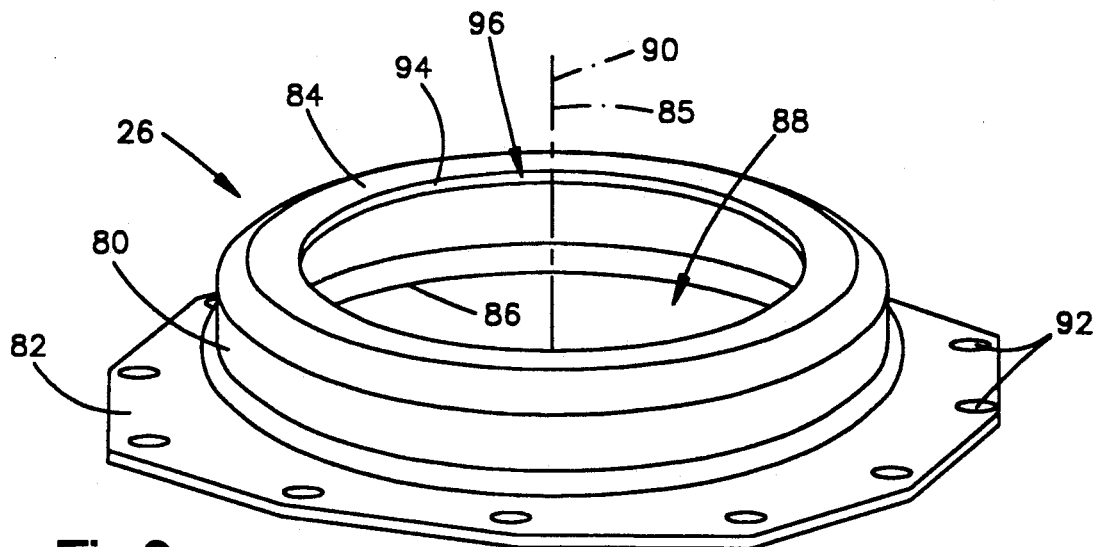
FIG. 6 is a perspective view of another part of the apparatus of FIG. 1 prior to assembly of the apparatus.
Figure 7A:
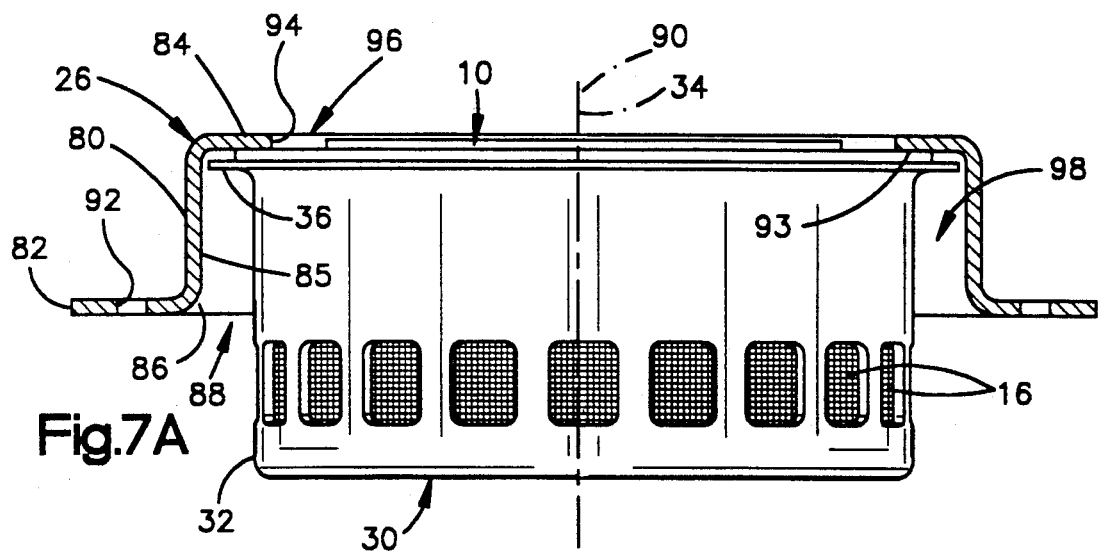
FIG. 7A a is side view of parts of the apparatus of FIG. 1 in a partially assembled condition.
Figure 7B:
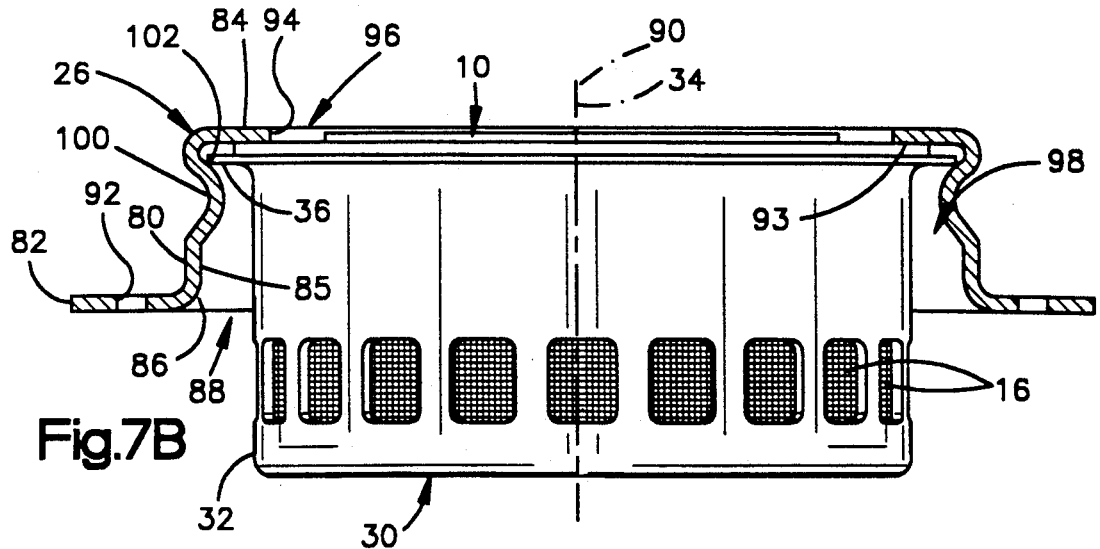
FIG. 7B is a view of the parts shown in FIG. 7A in a more fully assembled condition.

As shown in FIGS. 6, 7A and 7B, the retainer 26 is a one-piece stamped member having a ring shape with a cylindrical wall 80, a first flange 82 and a second flange 84. The cylindrical wall 80 has an annular inner wall surface 85 and, at one end, an inner edge surface 86 which defines a first retainer opening 88. The first retainer opening 88 has a diameter greater than the diameter of the flange 36 on the inflator 10, and is centered on an axis 90. The first flange 82 on the retainer 26 extends radially outward from one end of the cylindrical wall 80, and has a plurality of apertures 92. The second flange 84 on the retainer 26 extends radially inward from the other end of the cylindrical wall 80, and has a radially extending inner surface 93. The second flange 84 also has an annular edge surface 94 which defines a second retainer opening 96. The second retainer opening 96 has a diameter smaller than the diameter of the flange 36 on the inflator 10, and is also centered on the axis 90. The retainer 26 thus defines a cylindrical chamber 98 for receiving the inflator 10. The chamber 98 extends axially from the first retainer opening 88 to the second retainer flange 84. The retainer 26 is formed of a ductile material, such as cold rolled steel or T-O aluminum.

As shown in FIG. 7A and 7B, the inflator 10 is received in the chamber 98 in the retainer 26. The inflator 10 is moved along the axis 90 through the first retainer opening 88 toward the second retainer flange 84. The inflator 10 is thus moved into an assembled position wherein a portion of the flange 36 on the inflator 10 abuts the inner surface 93 of the second retainer flange 84. After the inflator 10 is received in its assembled position in the retainer 26, the cylindrical wall 80 of the retainer 26 is crimped radially inward from the configuration shown in FIG. 7A to the configuration shown in FIG. 7B. The cylindrical wall 80 then has an annular crimped portion 100 extending radially inward. The inner surface 85 of the cylindrical wall 80 is thus provided with an annular crimped portion 102 facing axially toward the inner surface 93 of the second retainer flange 82. The annular crimped portion 102 of the inner wall surface 85 firmly engages the flange 36 on the inflator 10 so that the flange 36 is clamped in the retainer 26 between the crimped portion 100 and the second retainer flange 84. The crimped portion 100 and the second retainer flange 84 thus fix the inflator 10 to the retainer 26.

After the inflator 10 is fixed to the retainer 26 as shown in FIG. 7B, the inflator 10 and the retainer 26 are assembled into the module 20 as shown in FIG. 2. The air bag 12 and the support plate 24 are received coaxially over the retainer 26 in overlying relationship with the first retainer flange 82. The apertures 54, 66 and 92 on the air bag 12, the support plate 24 and the retainer 26 are aligned with each other so that suitable fasteners can be received through the apertures 54, 66 and 92 to fasten the air bag 12 and the retainer 26 to the support plate 24.

Although the invention has been described above with particular reference to an inflator which has a flange at one end of a cylindrical housing and which incorporates solid, combustible gas generating material, the invention can be used with other types of inflators. For example, the invention can be used with an inflator having a flange approximately midway between the ends of a cylindrical housing. The invention can also be used with an inflator using other sources of gas, such as a container of gas under pressure, with or without a supplementary, combustible gas generating material.

From the foregoing description of the invention, those skilled in the art will perceive improvements, changes and modifications. Such improvements, changes and modifications within the skill of the art are intended to be covered by the appended claims.

Having described the invention, the following is claimed:

1. An apparatus comprising:
   an inflatable vehicle occupant restraint;
   an inflator for inflating said restraint, said inflator having a housing having a wall defining an inflator flange;
   a support member for supporting said restraint and said inflator in a vehicle; and
   a retainer member having an annular wall with a crimped portion, a first retainer flange extending from said annular wall, and a second retainer flange extending from said annular wall at a location spaced axially from said first retainer flange;
   said annular wall surrounding said inflator, said first retainer flange being connectable with said support member, said second retainer flange and said crimped portion of said annular wall clamping said inflator flange between said second retainer flange and said crimped portion of said annular wall;
   said first retainer flange extending radially outward from said annular wall, said second retainer flange extending radially inward from said annular wall.

2. An apparatus as defined in claim 1 wherein said crimped portion of said annular wall extends circumferentially entirely around said annular wall.

3. An apparatus as defined in claim 1 wherein said annular wall has first and second ends, said first retainer flange extending from said first end, said second retainer flange extending from said second end.

4. An apparatus comprising:
   an inflatable vehicle occupant restraint;
   an inflator for inflating said restraint, said inflator including a housing with an axis and a wall portion extending radially outward;
   a support member for supporting said restraint and said inflator in a vehicle; and
   a retainer member having first means connectable with said support member and second means clamping said inflator to said retainer member;
   said second means comprising an annular wall of said retainer member, said annular wall encircling said inflator, said second means further comprising first and second clamping surface portions of said retainer member extending radially inward of said wall portion of said inflator housing, said first and second clamping surface portions of said retainer member facing each other in opposite directions along said axis and clamping said wall portion of said inflator housing axially between said first and second clamping surface portions, said first clamping surface portion being located on a crimped portion of said annular wall.

5. An apparatus as defined in claim 4 wherein said crimped portion of said annular wall extends circumferentially entirely around said axis.

6. An apparatus as defined in claim 4 wherein said inflator has a cylindrical housing, said wall portion of said inflator housing being a circular flange extending radially outward of said housing.

7. An apparatus as defined in claim 4 wherein said second clamping surface portion of said retainer member is located on a flange extending radially inward from said annular wall.

8. An apparatus comprising:
an inflatable vehicle occupant restraint;
an inflator for inflating said restraint, said inflator comprising an inflator housing which contains a gas generating material, said inflator further comprising an inflator flange, said inflator flange being a portion of said inflator housing;
a support member for supporting said restraint and said inflator housing in a vehicle; and
a retainer member having an annular wall with a crimped portion, a first retainer flange extending from said annular wall, and a second retainer flange extending from said annular wall at a location spaced axially from said first retainer flange;
said annular wall surrounding said inflator housing, said first retainer flange being connectable with said support member, said second retainer flange and said crimped portion of said annular wall clamping said inflator flange between said second retainer flange and said crimped portion of said annular wall;
said first retainer flange extending radially outward from said annular wall, said second retainer flange extending radially inward from said annular wall.

9. Apparatus as defined in claim 8 wherein said inflator housing has a wall means for defining a body wall portion of said inflator housing and for defining said inflator flange, said body wall portion of said inflator housing having gas outlet openings, said wall means having a continuous portion which includes both said inflator flange and said body wall portion of said inflator housing.

10. Apparatus as defined in claim 8 wherein said support member has an edge surface defining an opening, said inflator housing having an axis which extends through said opening.

11. Apparatus as defined in claim 8 wherein said crimped portion of said annular wall extends circumferentially entirely around said annular wall.

12. An apparatus as defined in claim 8 wherein said annular wall has first and second ends, said first retainer flange extending from said first end, said second retainer flange extending from said second end.

13. An apparatus comprising:
an inflatable vehicle occupant restraint;
an inflator for inflating said restraint, said inflator comprising a housing having an axis, said housing having a plurality of gas outlet openings, said housing further including a wall portion which extends radially outward;
a support member for supporting said restraint and said inflator in a vehicle; and a retainer member having first means connectable with said support member and second means clamping said inflator to said retainer member;
said second means comprising an annular wall of said retainer member, said annular wall encircling said housing, said second means further comprising first and second clamping surface portions of said retainer member which extend radially inward of said wall portion of said housing which extends radially outward, said first and second clamping surface portions of said retainer member facing each other in opposite directions along said axis and clamping said wall portion of said housing axially between said first and second clamping surface portions, said first clamping surface portion being located on a crimped portion of said annular wall.

14. An apparatus as defined in claim 13 wherein said housing has a wall means for defining a cylindrical body wall portion of said housing, said wall portion of said housing extending radially outward therefrom, said body wall portion of said housing including said gas outlet openings, said wall means having a continuous portion which includes both said cylindrical body wall portion of said housing and said wall portion of said housing which extends radially outward.

15. An apparatus as defined in claim 13 wherein said support member has an edge surface defining an opening, said housing extending through said opening.

16. An apparatus as defined in claim 13 wherein said crimped portion of said annular wall extends circumferentially entirely around said axis.

17. An apparatus as defined in claim 13 wherein said housing has a cylindrical wall, said wall portion of said housing which extends radially outward being a circular flange extending circumferentially around said cylindrical wall.

18. An apparatus as defined in claim 13 wherein said second clamping surface portion of said retainer member is located on a flange extending radially inward from said annular wall.

19. An apparatus comprising:
an inflatable vehicle occupant restraint;
an inflator for inflating said restraint, said inflator comprising an inflator housing which contains a gas generating material, said inflator housing having an axis;
a support member for supporting said restraint and said inflator in a vehicle, said support member having an edge surface defining an opening through which said axis extends;
a retainer member having means connectable with said support member; and
clamping means for clamping said inflator housing to said retainer member, said clamping means comprising an annular wall of said retainer member, said annular wall encircling said inflator housing, said clamping means further comprising first and second clamping surface portions of said retainer member, said first and second clamping surface portions of said retainer member facing each other and clamping a portion of said inflator housing between said first and second clamping surface portions, said first clamping surface portion being located on a crimped portion of said annular wall.

20. An apparatus as defined in claim 19 wherein said clamping means consists of said annular wall of said retainer member and said first and second clamping surface portions of said retainer member.

21. An apparatus as defined in claim 20 wherein said crimped portion of said annular wall extends circumferentially entirely around said axis.

22. An apparatus as defined in claim 20 wherein said inflator has a cylindrical wall, said portion of said housing which is clamped between said first and second clamping surface portions of said retainer member being a circular flange extending radially outward from said cylindrical wall.

23. An apparatus as defined in claim 20 wherein said second clamping surface portion of said retainer member is located on a flange extending radially inward from said annular wall.

* * * * *